United States Patent
Manco et al.

(10) Patent No.: US 7,859,253 B2
(45) Date of Patent: Dec. 28, 2010

(54) MAGNETIC STRUCTURE FOR DETECTING A RELATIVE MOTION BETWEEN THE MAGNETIC STRUCTURE AND A MAGNETIC FIELD SENSOR

(75) Inventors: Angelo Manco, Schlieren (CH); Robert Racz, Zug (CH); Michael Triulzi, Brunnen (CH)

(73) Assignee: Melexis Tessenderlo NV, Tessenderlo (BE)

( * ) Notice: Subject to any disclaimer, the term of this patent is extended or adjusted under 35 U.S.C. 154(b) by 390 days.

(21) Appl. No.: 12/146,743

(22) Filed: Jun. 26, 2008

(65) Prior Publication Data

US 2009/0001971 A1 Jan. 1, 2009

(30) Foreign Application Priority Data

Jun. 29, 2007 (CH) ..................................... 1074/07
Mar. 28, 2008 (CH) ..................................... 0476/08

(51) Int. Cl.
*G01B 7/14* (2006.01)
*G01B 7/30* (2006.01)

(52) U.S. Cl. ............................. 324/207.25; 324/207.24

(58) Field of Classification Search ............ 324/207.24, 324/207.25
See application file for complete search history.

(56) References Cited

U.S. PATENT DOCUMENTS

| | | | |
|---|---|---|---|
| 4,307,981 A | 12/1981 | Weirich et al. | |
| 4,319,188 A | 3/1982 | Ito et al. | |
| 4,471,304 A | 9/1984 | Wolf | |
| 5,493,216 A * | 2/1996 | Asa | .......... 324/207.2 |
| 5,680,042 A | 10/1997 | Griffen et al. | |
| 6,731,108 B2 | 5/2004 | Zalunardo et al. | |
| 6,992,479 B2 * | 1/2006 | Lequesne et al. | ....... 324/207.21 |

FOREIGN PATENT DOCUMENTS

| | | |
|---|---|---|
| DE | 29 07 797 A1 | 1/1980 |
| DE | 29 45 895 A1 | 5/1981 |
| DE | 31 37951 A1 | 4/1983 |
| DE | 42 34 277 A1 | 4/1994 |
| DE | 20 2006 001 597 U1 | 5/2006 |
| EP | 0 979 988 A1 | 8/1999 |
| EP | 1 243 897 A1 | 10/2001 |
| GB | 2 048 354 A | 12/1980 |
| GB | 2 106 984 A | 4/1983 |
| WO | 94/07037 | 3/1994 |

* cited by examiner

*Primary Examiner*—Reena Aurora
(74) *Attorney, Agent, or Firm*—McCormick, Paulding & Huber LLP (57) ABSTRACT

A magnetic structure for detecting a relative motion between the magnetic structure and a magnetic field sensor comprises at least two permanent magnets. The permanent magnets are arranged along a predetermined line which for example is a straight or circular line at a predetermined distance g from each other. The permanent magnets are magnetized in the direction of the line, adjacent permanent magnets having an opposite direction of magnetization.

20 Claims, 7 Drawing Sheets

Fig. 14

MAGNETIC STRUCTURE FOR DETECTING A RELATIVE MOTION BETWEEN THE MAGNETIC STRUCTURE AND A MAGNETIC FIELD SENSOR

PRIORITY CLAIM

Applicant hereby claims foreign priority under 35 U.S.C. §119 from Swiss Application No. 1074/07 filed Jun. 29, 2007 and Swiss Application No. 476/08 filed Mar. 28, 2008, the disclosure of which is herein incorporated by reference.

FIELD OF THE INVENTION

The invention concerns a magnetic structure for detecting a relative motion between the magnetic structure and a magnetic field sensor.

BACKGROUND OF THE INVENTION

A combination of a magnetic structure and a magnetic field sensor forms a contactless position encoder with which linear relative motions can be measured. Position encoders for paths in the millimeter range are currently used in large numbers in apparatuses of machine and car industry.

In the case of applications in which the position encoders are subject to high levels of dirt such as dust, fibers, oil vapors, etc., magnetic position encoders represent a sturdy and cheap alternative to the widely used optical position encoders because they do not require any tight encapsulation between the moved and the unmoved mechanical part of the apparatus.

A combination of a magnetic structure and a magnetic field sensor can also form an angle encoder with which a rotational angle can be measured.

A method for contactless determination of linear relative motions between a magnetic structure and electronic sensors is known from EP 979988. The magnetic structure contains either a single axially magnetized permanent magnet or several permanent magnets which are arranged next to one another and are magnetized in a helical manner. The sensors are arranged laterally spaced from the permanent magnets and measure the radial and axial component of the magnetic field generated by the magnetic structure.

From EP 1243897 an apparatus is known in which the magnetic field generated by the magnetic structure is rotationally symmetrical with respect to an axis of symmetry and a magnetic field sensor measures two components of the magnetic field which are situated in a plane extending orthogonally to the axis of symmetry of the magnetic field source.

SUMMARY OF THE INVENTION

The invention is based on the object of developing a magnetic structure for use in a position encoder, wherein the position encoder should deliver a linear output signal in a comparatively large working range of typically 20 to 60 mm.

A magnetic structure for detecting a relative motion between the magnetic structure and a magnetic field sensor according to the invention comprises at least two permanent magnets wherein the permanent magnets are arranged along a predetermined line at a predetermined distance g from each other, the permanent magnets are magnetized in the direction of the line, adjacent permanent magnets have an opposite direction of magnetization, and the distance g fulfills the two conditions $g \geq 0.25 * l_{min}$ and $g \leq 4 * l_{max}$, with the quantity $l_{min}$ designating a length of the shortest of the permanent magnets as measured along the line and the quantity $l_{max}$ a length of the longest of the permanent magnets as measured along the line.

Between at least two of the permanent magnets a body of a magnetic material having a relative magnetic permeability of at least 100 may be arranged.

A magnetic field sensor and such a magnetic structure, wherein the magnetic field sensor and the magnetic structure are displaceable relative to one another along a predetermined path between two predetermined end points form for example a position encoder or an angle encoder. With a position encoder the magnetic structure and the magnetic field sensor are displaceable relative to each other along a straight line. With an angle encoder the magnetic structure and the magnetic field sensor are displaceable relative to each other along a circular line. The direction of the magnetic field generated by the magnetic structure rotates along the path. In a first embodiment, the rotation of the magnetic field during the relative movement from one end point to the other end point in the plane as opened up by the line and the path is at most 360°. In another embodiment the magnetic structure comprises at least three permanent magnets and the strength of the magnetic field generated by the permanent magnets along the path increases continuously or discontinuously between the two end points of the path and the magnetic field rotates by more than 360°.

BRIEF DESCRIPTION OF THE DRAWING FIGURES

The accompanying drawings, which are incorporated into and constitute a part of this specification, illustrate one or more embodiments of the present invention and, together with the detailed description, serve to explain the principles and implementations of the invention. The figures are not to scale. In the drawings.

DETAILED DESCRIPTION OF THE PREFERRED EMBODIMENTS

The invention relates on the one hand to a magnetic structure which can be used in a position encoder as a magnetic field source, and relates on the other hand to a magnetic structure which can be used in an angle encoder as a magnetic field source. The following examples 1 to 6 relate to magnetic structures for position encoders in which the relative motion between the magnetic structure and a magnetic field sensor occurs along a predetermined axis. The position encoder is used for example in a pneumatic or hydraulic piston/cylinder system, with the magnetic structure being housed in the piston and the magnetic field sensor being fastened to the cylinder.

Example 1

Figure 1:
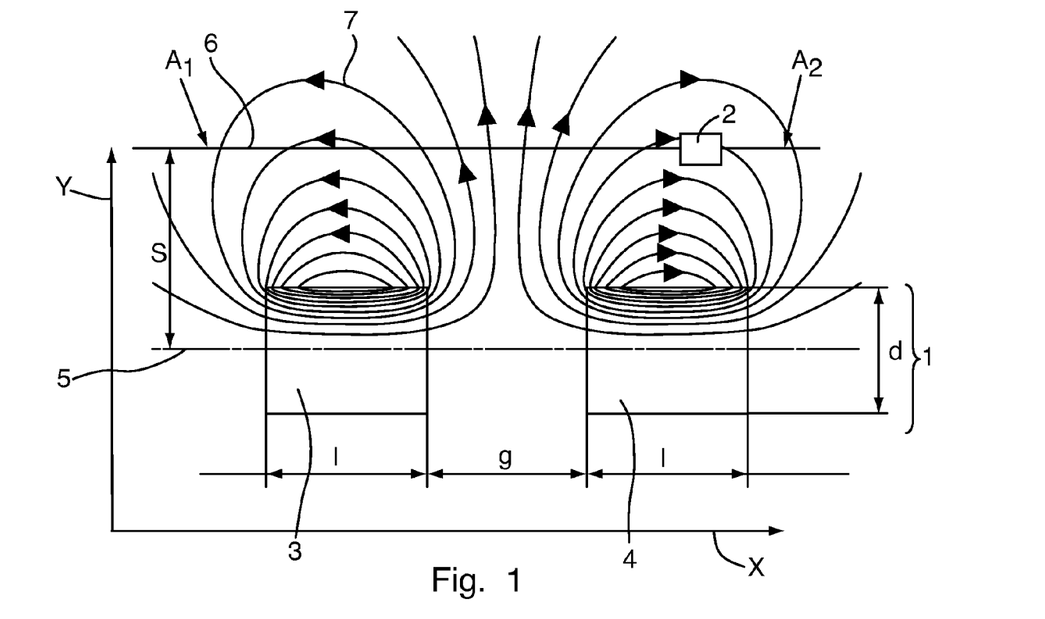
FIGS. 1-6 show a magnetic structure and a magnetic field sensor for contactless detection of a linear relative motion according to different embodiments of the invention.

FIG. 1 shows a magnetic structure 1 and a magnetic field sensor 2, which jointly form a position encoder. Magnetic structure 1 consists of two cylindrical permanent magnets 3 and 4. The permanent magnets 3, 4 are bar magnets, have the same length l and the same diameter d and are arranged on a common axis 5 at a distance g from each other. The bar magnets are axially magnetized, with their direction of magnetization being opposite of each other. Axis 5 is both an axis of symmetry of the individual permanent magnets 3, 4 as well as an axis of symmetry of the magnetic structure 1. The magnetic field generated by the magnetic structure 1 is rotationally symmetrical concerning the axis 5. The magnetic structure 1 is displaceable relative to the magnetic field sensor 2 between two end positions $A_1$ and $A_2$ along an axis 6 extending parallel to the axis of symmetry of the magnetic structure 1. The permanent magnets 3 and 4 are fastened to a carrier (not shown).

FIG. 1 also shows the flux lines 7 of the magnetic field generated by the magnetic structure 1, with the flux lines 7 in the area beneath the axis 5 having been omitted for reasons of clarity of the drawing and with the arrow tips indicating the direction of the magnetic field. The two axes 5 and 6 define a plane E which corresponds to the plane of the drawing.

The magnetic sensor 2 comprises a sensor part which measures the component $B_x$ running in the x-direction and the component $B_y$ running in the y-direction of the magnetic field B generated by the magnetic structure 1, with the x-direction extending parallel to the axis 5 and the y-direction perpendicular to the axis 6 and with both the x-direction as well as the y-direction lying in the plane E. The magnetic field sensor 2 further comprises an electronic circuit which operates the sensor part and forms a monotonous position signal from the signals delivered by the sensor part, which position signal characterizes the position of the magnetic field sensor 2 taken on the axis 6. The position signal is the ratio $B_y/B_x$ or the function $\arctan(B_y/B_x)$ or a linearized signal derived from the ratio $B_y/B_x$ or the function $\arctan(B_y/B_x)$. The linearization can occur by means of a table for example. The magnetic field sensor 2 can be a magnetic angle sensor which is already available on the market and which measures the two components $B_x$ and $B_y$ and forms therefrom the position signal as mentioned above.

In the case of a displacement along the straight path $A_1$-$A_2$, the direction of the magnetic field generated by the magnetic structure 1 will change continuously: the magnetic field B rotates along the path $A_1$-$A_2$ in the plane opened by axis 5 and the path $A_1$-$A_2$. At the end positions $A_1$ and $A_2$, the direction of the magnetic field B is the same, with the magnetic field B performing along the path $A_1$-$A_2$ at most a complete rotation by 360°. The magnetic structure 1 is optimal when the direction of the magnetic field rotates evenly along the path $A_1$-$A_2$, i.e. when the x-component $B_x$ has a sinusoidal and the y-component $B_y$ has a cosinusoidal progression to the highest possible extent. The more even the rotation of the magnetic field B along the path $A_1$-$A_2$, the higher the linearity of the function $\arctan(B_y/B_x)$ and the lower the fluctuations of the resolution along the path $A_1$-$A_2$. The evenness of the rotation of the magnetic field B depends on the one hand on the ratio of the length l of the two permanent magnets 3, 4, the distance g between the two permanent magnets 3, 4 and the diameter d of the two permanent magnets 3, 4 on the one hand and the distance S between the two axes 5 and 6 on the other hand. A single permanent magnet 3, 4 generates a magnetic field with the desired properties when the diameter d and the length l fulfill the relation $$0.25*l \leq d \leq 4*l \quad (1)$$

but preferably the relation $$0.5*l \leq d \leq 1.5*l \quad (2)$$

The magnetic structure 1 generates a magnetic field with the desired properties when additionally the distance g and the length l of the permanent magnets 3, 4 fulfill the relation $$g \geq 0.25*l \quad (3),$$

but preferably the relation $$g \geq 0.5*l \quad (4)$$

The distance g may conversely not be too large, i.e.

$$g \leq 4*l \quad (5)$$

In the case of applications in which the path $A_1$-$A_2$ is straight, i.e. in the case of position encoders, the following is preferable $$g \leq 2*l \quad (6),$$

and especially preferable $$g \leq 1.5*l \quad (7).$$

In the example, $d \approx 0.8*l$ and $g \approx l$. The optimal distance of the magnetic field sensor 2, i.e. the distance S between the two axes 5 and 6, lies in a range of $$0.75*d \leq S \leq 2.5*d \quad (8).$$

The length of the path $A_1$-$A_2$ on which the magnetic field rotates about precisely 360° depends on the distance S. The following applies however:

$$A_1-A_2 \geq 2*l+g \quad (9).$$

Example 2

Figure 2:
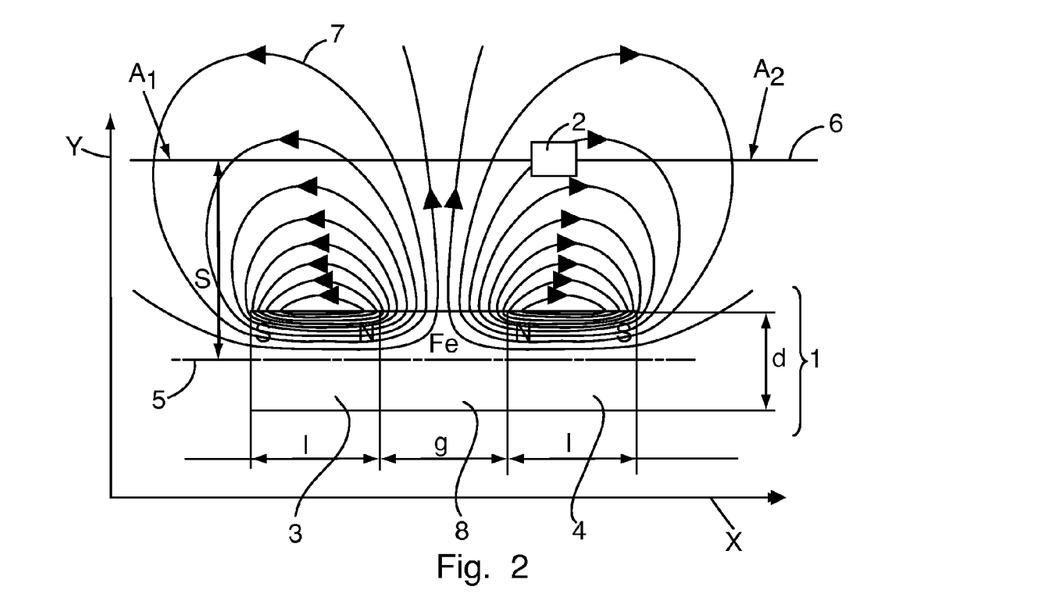

FIG. 2 shows a magnetic structure 1 in which a cylindrical body 8 made of ferromagnetic material is arranged between the cylindrical permanent magnets 3 and 4, and the magnetic field sensor 2. The letters N and S designate the north pole or south pole of the permanent magnets 3, 4. The body 8 is rotationally symmetrical with respect to the axis 5 and in this example has the same diameter as the permanent magnets 3 and 4. The relative magnetic permeability of the ferromagnetic body 8 can have any desired value, but is advantageously higher than 100. The ferromagnetic body 8 consists of iron (Fe) for example. The ferromagnetic body 8 is used to optimize the magnetic field generated by the permanent magnet along the path $A_1$-$A_2$ in such a way that the direction of the magnetic field B is to rotate as evenly as possible along the path $A_1$-$A_2$. The progression of the flux lines 7 is changed in the area of the ferromagnetic body 8 because the flux lines emerge perpendicularly from the surface of the ferromagnetic body 8. In order to obtain an even rotation of the magnetic field along the path $A_1$-$A_2$, the equations (1) to (8) must be taken into account in this example too. The length of the path $A_1$-$A_2$ on which the magnetic field rotates about precisely 360° depends on the distance S. The equation (9) applies in this case too.

The diameter of the body 8 can also be slightly larger or smaller than the diameter of the permanent magnets as long as this does not significantly reduce the evenness of the rotation of the magnetic field.

The following examples relate to further variants of the principal ideas as explained with respect to examples 1 and 2.

Example 3

Figure 3:
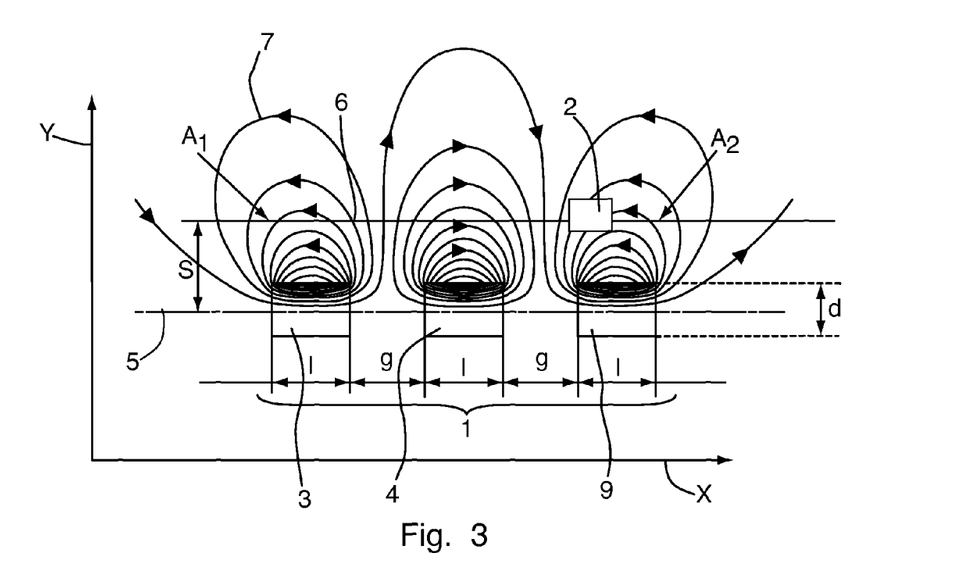

FIG. 3 shows a magnetic structure 1 which consists of three cylindrical permanent magnets 3, 4 and 9. The permanent magnets 3, 4 and 9 are again bar magnets, have a same length l and a similar diameter d and are arranged on the joint axis 5. The permanent magnets 3, 4 and 9 are axially magnetized, with the direction of magnetization of adjacent permanent magnets being opposite to each other. The direction of magnetization thus changes by 180° from permanent magnet to permanent magnet. Accordingly, the sense of rotation of the flux lines 7 also changes as is shown in FIG. 3.

Example 4

Figure 4:
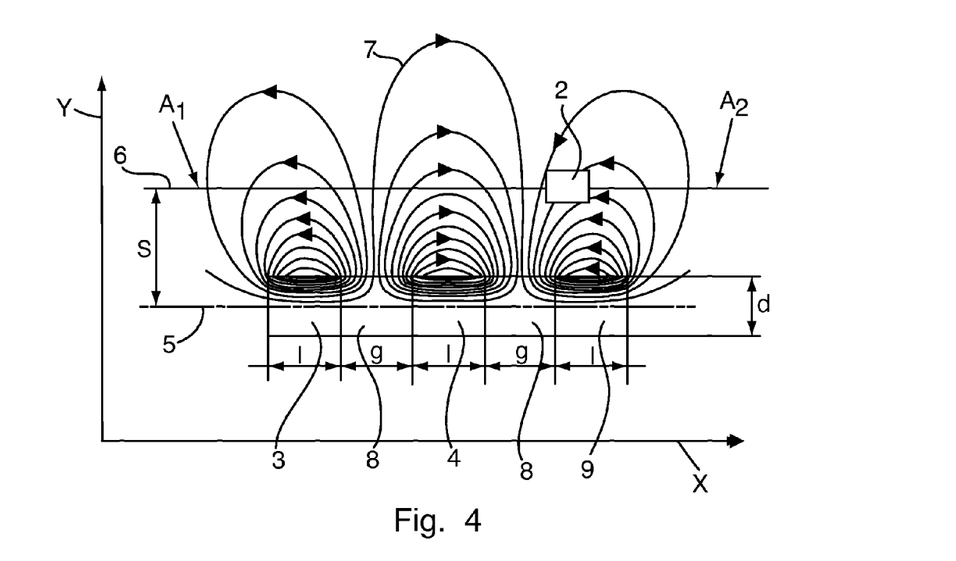

FIG. 4 shows a magnetic structure 1 in which a body 8 made of ferromagnetic material is arranged between the permanent magnets 3 and 4 as well as between the permanent magnets 4 and 9. The bodies 8 are rotationally symmetrical with respect to the axis 5 and in this example also have the same diameter as the permanent magnets 3, 4 and 9.

Example 5

Figure 5:
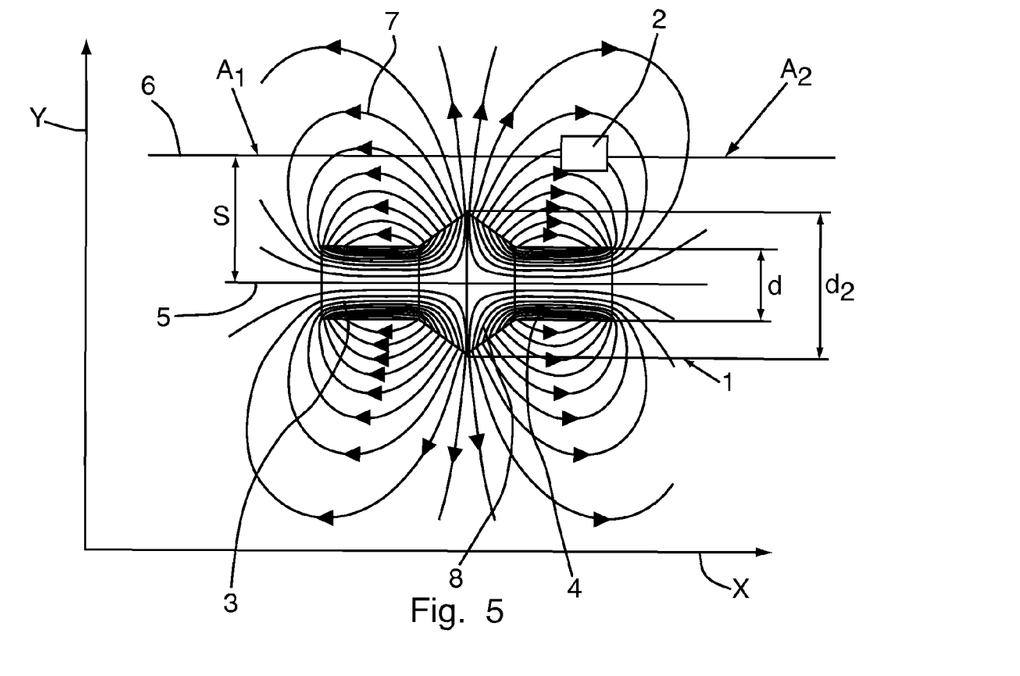

FIG. 5 shows a magnetic structure 1, in which a body 8 made of ferromagnetic material is arranged between the cylindrical permanent magnets 3 and 4, and the magnetic field sensor 2. The body 8 is rotationally symmetrical with respect to axis 5. Its diameter increases continuously from value d to value $d_2$ with increasing distance from permanent magnet 3 and 4 and reaches the maximum value $d_2$ in the middle between the two permanent magnets 3 and 4.

Example 6

Figure 6:
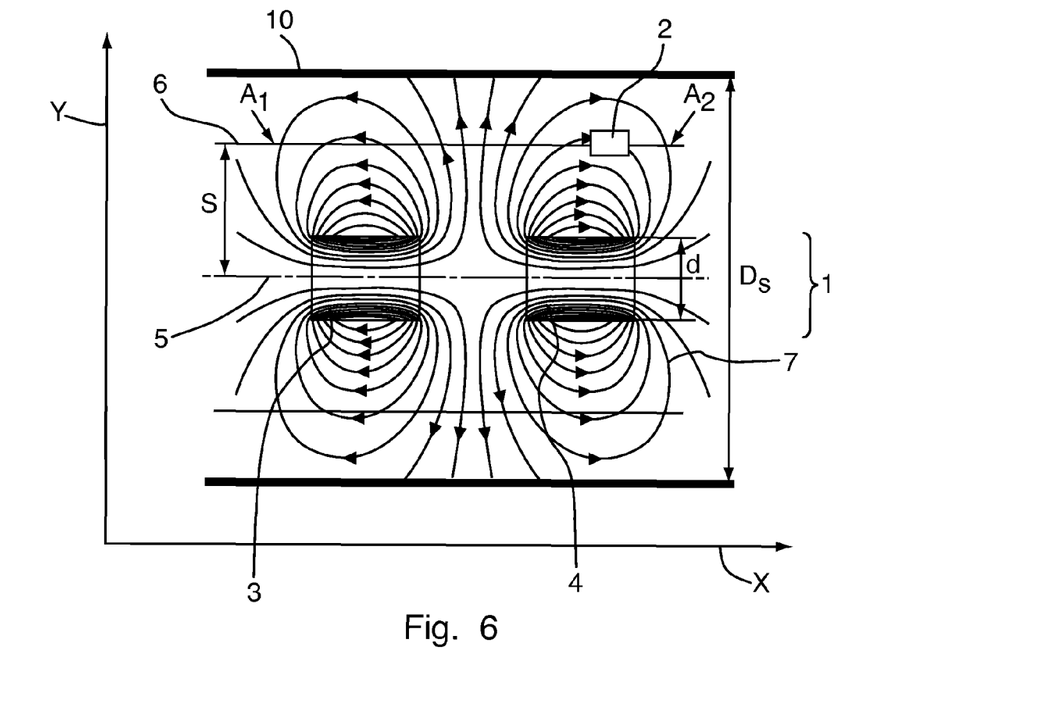

FIG. 6 shows a magnetic structure 1 which additionally comprises a magnetic shielding 10 which consists of a material with a high relative magnetic permeability of at least 100. The magnetic shielding 10 encloses the position encoder formed by the permanent magnets 3 and 4 and the magnetic field sensor 2. The magnetic shielding 10 is preferably a cylindrical tube. In the example, this tube has the diameter $D_S$. The magnetic shielding 10 screens the position encoder against external magnetic fields extending in the x-direction on the one hand, and can contribute on the other hand to the optimization of the progression of the flux lines 7 in the area of the path $A_1$-$A_2$ in the case of suitable dimensioning.

The magnetic shielding 10 is displaceable either together with the remainder of the magnetic structure 1 relative to the magnetic field sensor 2 or the magnetic structure 1 (without the magnetic shielding 10) is displaceable relative to the magnetic field sensor 2 and the magnetic shielding 10. In the second case, the shielding 10 can comprise an opening in the area of the magnetic field sensor 2 in order to reduce its influence on the magnetic field at the location of the magnetic field sensor 2 generated by the permanent magnets of the magnetic structure 1.

Figure 7:
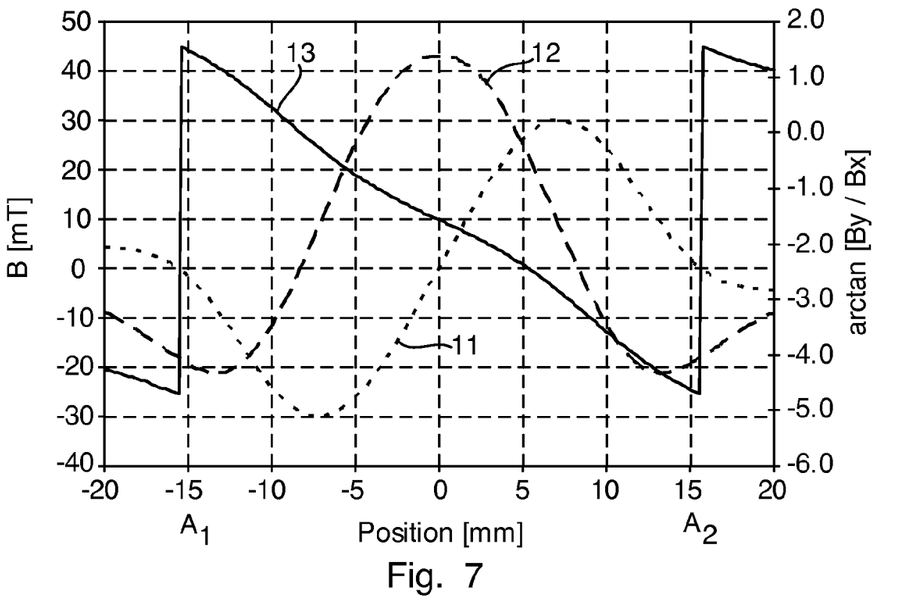
FIGS. 7, 8 show diagrams.
Figure 8:
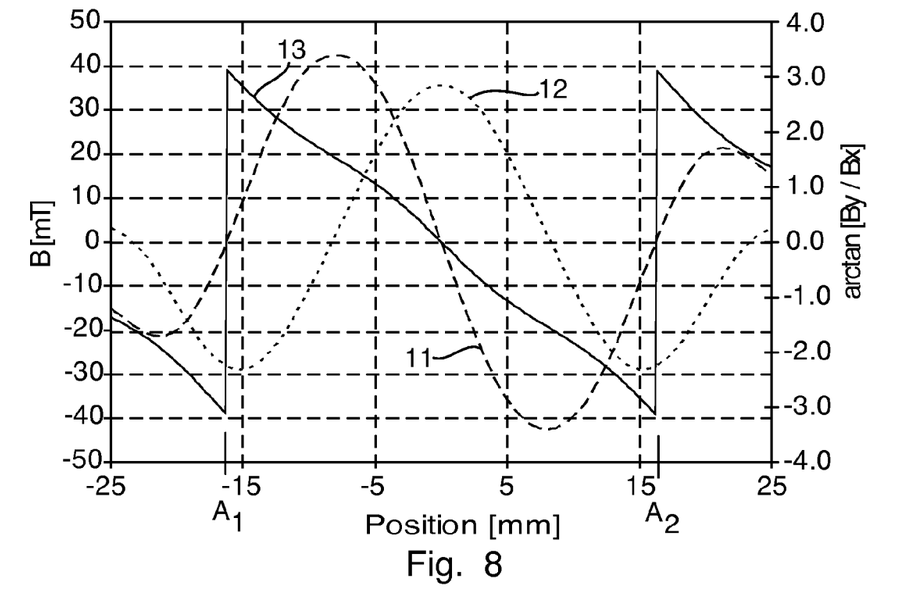

FIG. 7 shows three curves for example 1 and FIG. 8 shows three curves for example 2, which are the progression 11 of component $B_x$, the progression 12 of component $B_y$ of the magnetic field and the function $\arctan(B_y/B_x)$ as calculated therefrom depending on the position of the magnetic field sensor 2 taken on the axis 6. The function $\arctan(B_y/B_x)$ is marked with the reference numeral 13. The function $\arctan(B_y/B_x)$ is in all cases a monotonous function and within certain tolerances a linear function. These diagrams show that the linearity of the function $\arctan(B_y/B_x)$ is higher in the presence of the ferromagnetic bodies 8 than in their absence.

Since in all above described examples the magnetic field B as generated by the magnetic structure 1 is rotationally symmetrical with respect to the axis 5, the piston can rotate along the axis 5 relative to the cylinder in a piston/cylinder system during the relative displacement of the magnetic structure 1 and the magnetic field sensor 2 without this having an influence on the position signal.

The magnetic structures as described with respect to FIGS. 1 to 6 comprise either two or three permanent magnets which all have the same length l and the same diameter. Although this is the preferred solution, the permanent magnets can also have different lengths and/or different diameters. In this case, the equations (1) through (7) shall be replaced by the equations (1A) through (7A)

$$0.25*l_{min} \leq d \leq 4*l_{max} \tag{1A}$$

$$0.5*l_{min} \leq d \leq 1.5*l_{max} \tag{2A}$$

$$g \geq 0.25*l_{min} \tag{3A},$$

$$g \geq 0.5*l_{min} \tag{4A}$$

$$g \leq 4*l_{max} \tag{5A}$$

$$g \leq 2*l_{max} \tag{6A},$$

$$g \leq 1.5*l_{max} \tag{7A},$$

with the quantity $l_{min}$ designating the length of the shortest of the permanent magnets as measured along the axis 5 and the quantity $l_{max}$ the length of the longest of the permanent magnets as measured along the axis 5.

The following examples 7 to 10 relate to magnetic structures for angle encoders in which the relative movement between the magnetic structure and a magnetic field sensor occurs along a circular path. These angle encoders are especially suitable for applications with continuous shafts. In these examples, the direction of the magnetization shall always mean the direction along the circular path. The fact that adjacent permanent magnets have a reversed direction of magnetization means that either their north poles or their south poles face each other. In these examples, the local x-component as measured by the sensor part of the magnetic field sensor corresponds to the component $B_t$ which is tangential to the circular line and the measured local y-component corresponds to the component $B_r$ of the magnetic field which is normal or radial with respect to the circular line. The magnetic structure is for example fastened to a continuous rotating shaft and the magnetic field sensor is attached in a stationary manner at a distance adjacent to the shaft. The examples for detecting a linear relative motion and for detecting a circular relative motion can principally be transformed into each other, such that the axes 5 and 6 are projected to two concentric circles or two concentric circular segments. The equations (1) through (8) or (1A) through (7A) and (8) apply analogously.

Example 7

Figure 9:
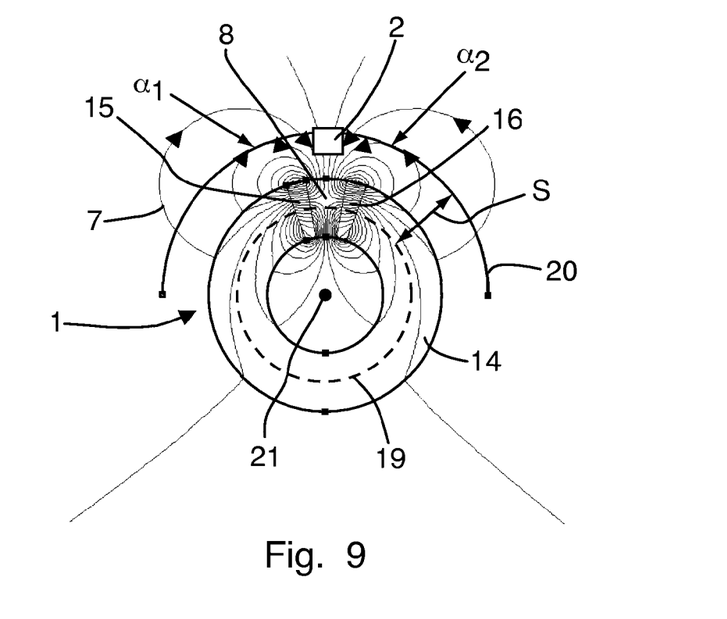
FIG. 9 shows a magnetic structure and a magnetic field sensor for contactless detection of a circular relative motion.
Figure 10:
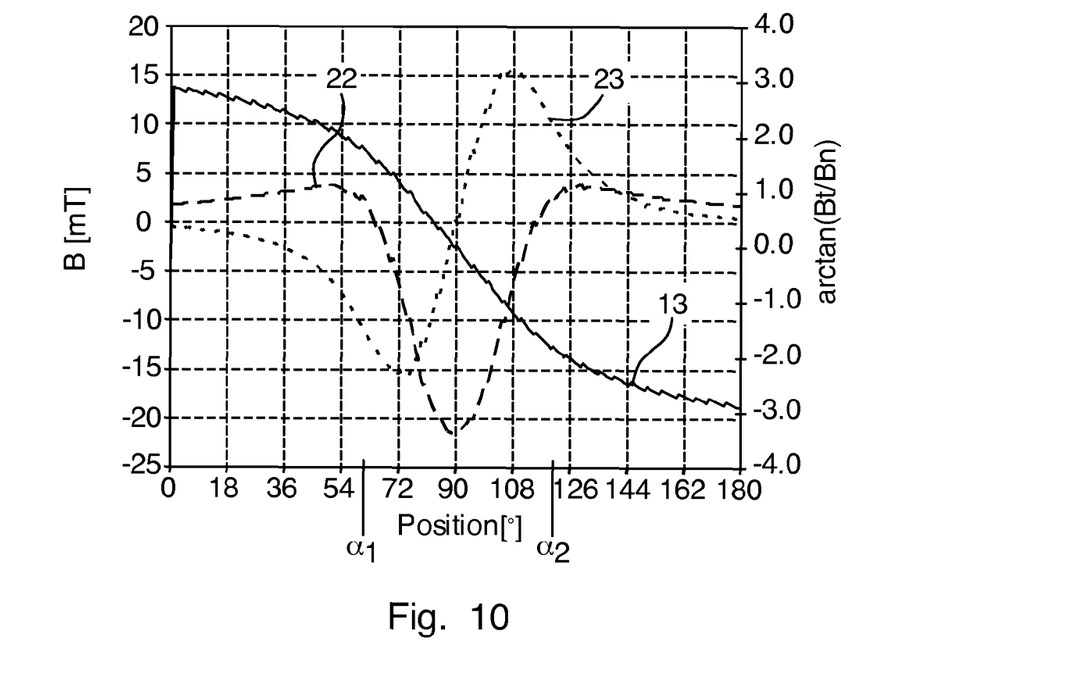
FIG. 10 shows a diagram.

FIG. 9 shows a magnetic structure 1 which comprises two permanent magnets 15 and 16 and two ferromagnetic bodies 8 and 14 which are arranged on a circular line 19. The circular line 19 is an axis of symmetry of the permanent magnets 15 and 16. The relative motion between the magnetic structure 1 and the magnetic field sensor 2 occurs along a circular line 20 which is concentric to the circular line 19. The permanent magnets 15 and 16 are therefore magnets which are preferably formed as arc-like magnets which extend along the circular line 19. The permanent magnets 15 and 16 are arranged at a distance from each other and their direction of magnetization extends opposite of each other, as seen in the direction of the circle. The cross section of the permanent magnets 15 and 16 is preferably round or rectangular. However, the permanent magnets 15 and 16 can also be two straight bar magnets. The permanent magnets 15 and 16 can also be composed of several straight bar magnets which touch each other and which have the same direction of magnetization. FIG. 10 shows the progression 22 and 23 of the components $B_r$ and $B_t$ of the magnetic field B generated by the magnetic structure 1, the component $B_r$ running radial with respect to the central point 21 of the circular line 19 and the component $B_t$ running tangential with respect to the central point 21 of the circular line 19. Usually, the magnetic structure 1 revolves about an axis which extends through the central point 21 and perpendicular to the plane of drawing, whereas the magnetic field sensor 2 is arranged in a stationary way. The components $B_x$ and $B_y$ as measured by the magnetic field sensor 2 then define a local rectangular system of coordinates, with the local component $B_x$ corresponding to the tangential component $B_t$ and the local component $B_y$ corresponding to the radial component $B_r$. FIG. 10 also shows the function $\arctan(B_y/B_x)=\arctan(B_r/B_t)$ as derived from the measured components. This shows that the function $\arctan(B_y/B_x)$ is monotonous and approximately linear in a limited angular range from $\alpha_1$ to $\alpha_2$, which ranges in the example from $\alpha_1=-30°$ to $\alpha_2=+30°$.

Example 8

Figure 11:
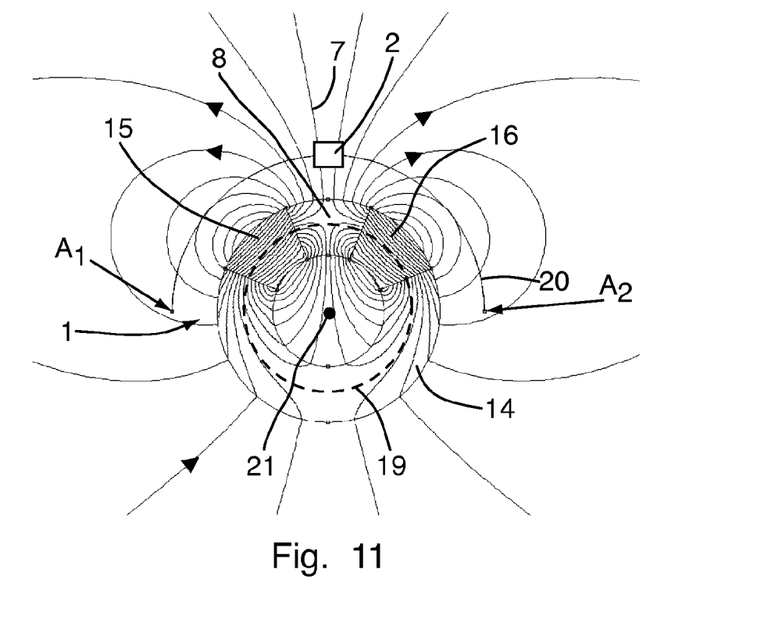
FIGS. 11-14 show further magnetic structures for contactless detection of a circular relative motion.
Figure 12:
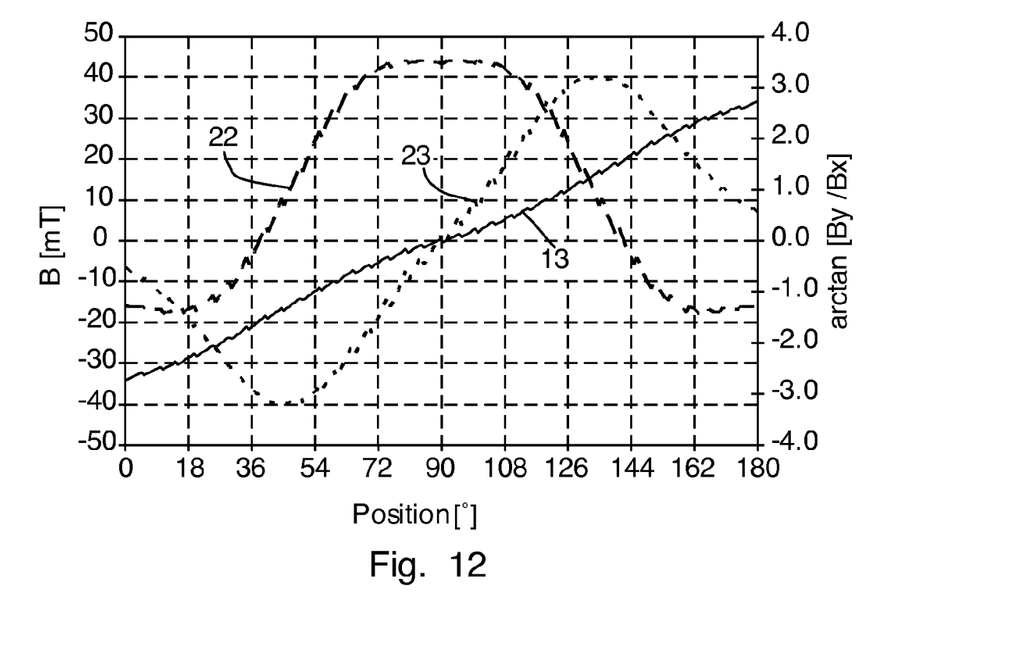

FIG. 11 shows a magnetic structure 1 in which the two permanent magnets 15 and 16 are longer than in the example 7, i.e. they cover a larger percentage of the circular line 19 in an angular respect. Accordingly, the angular range in which the function $\arctan(B_y/B_x)$ is approximately linear is enlarged. In this example, the angular range is already 180°, as can be seen from FIG. 12.

Example 9

Figure 13:
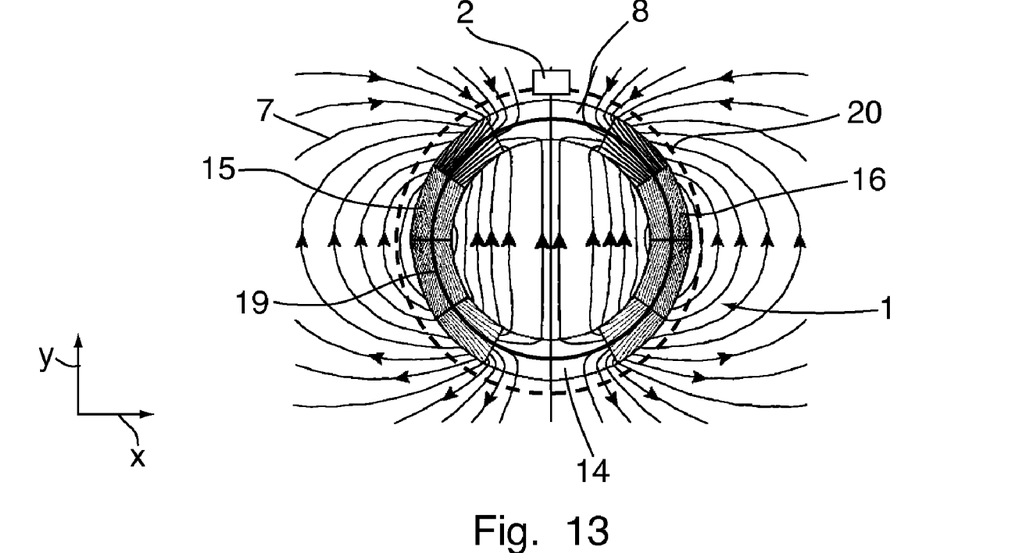

FIG. 13 shows a magnetic structure 1 in which the two permanent magnets 15 and 16 are longer than in the example 8. The angular range in which the function $\arctan(B_y/B_x)$ is approximately linear is 360° in this case.

Example 10

Figure 14:
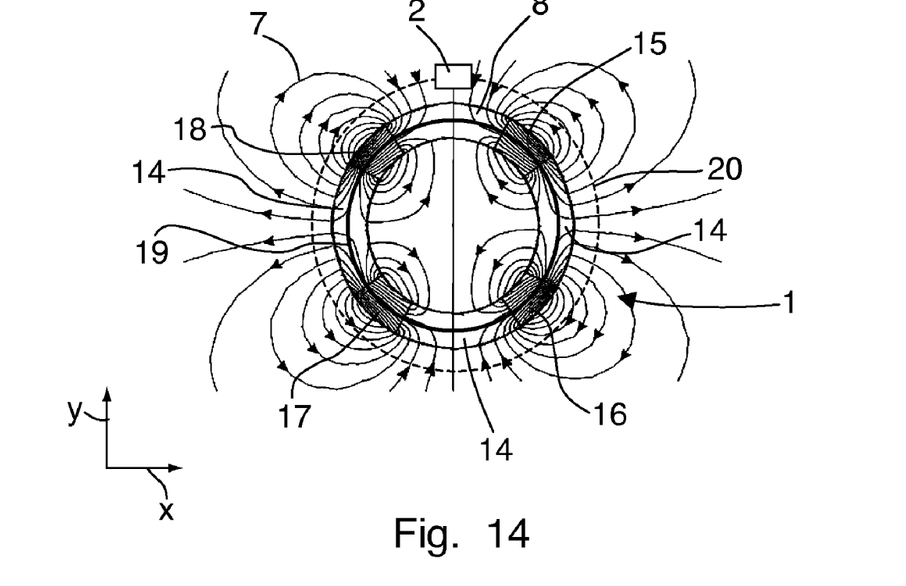

FIG. 14 shows a magnetic structure 1 which comprises four permanent magnets 15 to 18. The magnetic field generated by the magnetic structure 1 performs two complete rotations along the circular line 20, i.e. a rotation about 720°. The magnetic field generated by the permanent magnets 17 and 18 on the segment of the circular line 20 facing them is stronger than the magnetic field generated by the permanent magnets 15 and 16 on the segment of the circular line 20 facing them. This can be achieved for example in such a way that the permanent magnets 17 and 18 are longer and/or have a larger diameter and/or a stronger magnetization than the permanent magnets 15 and 16. The magnetic field sensor 2 therefore also calculates the value $|B_x^2+B_y^2|$ and determines therefrom whether it is located in the angular range of 0 to 180° or in the angular range of 180° to 360°. This magnetic structure 1 is therefore also suitable for position measurements in the angular range of 0 to 360°.

Example 11

The solution of example 10 can be generalized in the respect that at least three permanent magnets are arranged along the circular line 19, with the magnetic field generated by the permanent magnets along the circular line 20 increasing continuously or discontinuously between the two end points of the path and rotating by more than 360°, with the strength of the magnetic field increasing in any case in such a way that the position of the magnetic field sensor 2 with respect to the magnetic structure 1 can be determined definitely from the ratio $B_y/B_x$ or a function derived therefrom and the value $|B_x^2+B_y^2|$. This solution allows for a higher resolution of the angular measurement.

Example 12

The solution of example 10 can also be applied in the position encoders as described in connection with the examples 1 to 6 and can be generalized in the respect that more than two, at least three permanent magnets are arranged along the axis 5, with the magnetic field which is generated by the permanent magnets along the path covered by the magnetic field sensor 2 increasing continuously or discontinuously between the two end points of the path and rotating more than 360°, with the strength of the magnetic field increasing in any case in such a way that the position of the magnetic field sensor 2 with respect to the magnetic structure 1 can be determined definitely from the ratio $B_y/B_x$ or a function derived therefrom and the value $|B_x^2+B_y^2|$. The working range of such a position encoder can easily be increased to more than 60 mm.

The ferromagnetic bodies 8, 14 which are present in the examples 7 to 10 improve the linearity of the function arctan $(B_y/B_x)$. They can also be omitted however.

The cylindrical permanent magnets as well as the ferromagnetic bodies can be replaced in all embodiments by annular permanent magnets, i.e. bar magnets with a longitudinal bore, or annular bodies.

The permanent magnets can be enlarged in all embodiments by attaching a body made of ferromagnetic material whose relative permeability is at least 100 to at least one front side.

Various aspects of the invention have been explained on the basis of the preceding examples. It is clear that features of the various examples are not limited to the respective example but can be applied to all other examples.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims and their equivalents.

What is claimed is:

1. A magnetic structure for detecting a relative motion between the magnetic structure and a magnetic field sensor, the magnetic structure comprising at least two permanent magnets wherein
   the permanent magnets are arranged along a predetermined line at a predetermined distance g from each other,
   the permanent magnets are magnetized in the direction of the line,
   adjacent permanent magnets have an opposite direction of magnetization, and
   the distance g fulfills the two conditions $g \geq 0.25 * l_{min}$ and $g \leq 4 * l_{max}$, with the quantity $l_{min}$ designating a length of the shortest of the permanent magnets as measured along the line and the quantity $l_{max}$ a length of the longest of the permanent magnets as measured along the line.

2. A magnetic structure according to claim 1, wherein between at least two of the permanent magnets a body of a magnetic material having a relative magnetic permeability of at least 100 is arranged.

3. A position encoder, comprising a magnetic field sensor and a magnetic structure according to claim 2, with the magnetic field sensor and the magnetic structure being displaceable relative to one another along a predetermined path between two predetermined end points and with the direction of the magnetic field generated by the magnetic structure rotating along the path, wherein the rotation of the magnetic field during the relative movement from one end point to the other end point is at most 360° in the plane as opened up by the line and the path.

4. A position encoder according to claim 3, wherein said line and said path are arranged at a predetermined distance S from each other and the distance S fulfills the condition $0.75*d \leq S \leq 2.5*d$, with the quantity d designating the diameter of the permanent magnets as measured perpendicular to said line.

5. A position encoder, comprising a magnetic field sensor and a magnetic structure according to claim 2, with the magnetic field sensor and the magnetic structure being displaceable relative to one another along a predetermined path between two predetermined end points and with the direction of the magnetic field generated by the magnetic structure rotating along the path, wherein the magnetic structure comprises at least three permanent magnets, the strength of the magnetic field generated by the permanent magnets along the path increases continuously or discontinuously between the two end points of the path and the magnetic field rotates by more than 360°.

6. A position encoder according to claim 5, wherein said line and said path are arranged at a predetermined distance S from each other and the distance S fulfills the condition $0.75*d \leq S \leq 2.5*d$, with the quantity d designating the diameter of the permanent magnets as measured perpendicular to said line.

7. An angle encoder, comprising a magnetic field sensor and a magnetic structure according to claim 2, with the magnetic field sensor and the magnetic structure being displaceable along a predetermined circular path relative to one another between two predetermined end points and with the direction of the magnetic field generated by the magnetic structure rotating along the circular path, wherein the rotation of the magnetic field is not more than 360° in the plane as opened by the line and the circular path during the relative movement from one end point to the other end point.

8. An angle encoder, comprising a magnetic field sensor and a magnetic structure according to claim 2, with the magnetic field sensor and the magnetic structure being displaceable along a predetermined circular path relative to one another between two predetermined end points and with the direction of the magnetic field generated by the magnetic structure rotating along the circular path, wherein the magnetic structure comprises four permanent magnets, of which two adjacent permanent magnets have a stronger magnetization than the other two permanent magnets and the rotation of the magnetic field in the relative movement from one end point to the other end point is at most 720°.

9. The angle encoder according to claim 8, wherein said line and said path are arranged at a predetermined distance S from each other and wherein the distance S meets the condition $0.75*d \leq S \leq 2.5*d$, with the quantity d designating the diameter of the permanent magnets as measured radially to the circular path.

10. An angle encoder, comprising a magnetic field sensor and a magnetic structure according to claim 2, with the magnetic field sensor and the magnetic structure being displaceable along a predetermined circular path relative to one another between two predetermined end points and with the direction of the magnetic field as generated by the magnetic structure rotating along the circular path, wherein the magnetic structure comprises at least three permanent magnets, the strength of the magnetic field generated by the permanent magnets along the circular path increases continuously or discontinuously between the end points of the circular path and the magnetic field rotates by more than 360°.

11. The angle encoder according to claim 7, wherein said line and said path are arranged at a predetermined distance S from each other and wherein the distance S meets the condition $0.75*d \leq S \leq 2.5*d$, with the quantity d designating the diameter of the permanent magnets as measured radially to the circular path.

12. A position encoder, comprising a magnetic field sensor and a magnetic structure according to claim 1, with the magnetic field sensor and the magnetic structure being displaceable relative to one another along a predetermined path between two predetermined end points and with the direction of the magnetic field generated by the magnetic structure rotating along the path, wherein the rotation of the magnetic field during the relative movement from one end point to the other end point is at most 360° in the plane as opened up by the line and the path.

13. A position encoder according to claim 12, wherein said line and said path are arranged at a predetermined distance S from each other and the distance S fulfills the condition $0.75*d \leq S \leq 2.5*d$, with the quantity d designating the diameter of the permanent magnets as measured perpendicular to said line.

14. A position encoder, comprising a magnetic field sensor and a magnetic structure according to claim 1, with the magnetic field sensor and the magnetic structure being displaceable relative to one another along a predetermined path between two predetermined end points and with the direction of the magnetic field generated by the magnetic structure rotating along the path, wherein the magnetic structure comprises at least three permanent magnets, the strength of the magnetic field generated by the permanent magnets along the path increases continuously or discontinuously between the two end points of the path and the magnetic field rotates by more than 360°.

15. A position encoder according to claim 14, wherein said line and said path are arranged at a predetermined distance S from each other and the distance S fulfills the condition $0.75*d \leq S \leq 2.5*d$, with the quantity d designating the diameter of the permanent magnets as measured perpendicular to said line.

16. An angle encoder, comprising a magnetic field sensor and a magnetic structure according to claim 1, with the magnetic field sensor and the magnetic structure being displaceable along a predetermined circular path relative to one another between two predetermined end points and with the direction of the magnetic field generated by the magnetic structure rotating along the circular path, wherein the rotation of the magnetic field is not more than 360° in the plane as opened by the line and the circular path during the relative movement from one end point to the other end point.

17. An angle encoder, comprising a magnetic field sensor and a magnetic structure according to claim 1, with the magnetic field sensor and the magnetic structure being displaceable along a predetermined circular path relative to one another between two predetermined end points and with the direction of the magnetic field generated by the magnetic structure rotating along the circular path, wherein the magnetic structure comprises four permanent magnets, of which two adjacent permanent magnets have a stronger magnetization than the other two permanent magnets and the rotation of the magnetic field in the relative movement from one end point to the other end point is at most 720°.

18. The angle encoder according to claim 17, wherein said line and said path are arranged at a predetermined distance S from each other and wherein the distance S meets the condition $0.75*d \leq S \leq 2.5*d$, with the quantity d designating the diameter of the permanent magnets as measured radially to the circular path.

19. An angle encoder, comprising a magnetic field sensor and a magnetic structure according to claim 1, with the magnetic field sensor and the magnetic structure being displaceable along a predetermined circular path relative to one another between two predetermined end points and with the direction of the magnetic field as generated by the magnetic structure rotating along the circular path, wherein the magnetic structure comprises at least three permanent magnets, the strength of the magnetic field generated by the permanent magnets along the circular path increases continuously or discontinuously between the end points of the circular path and the magnetic field rotates by more than 360°.

20. The angle encoder according to claim 16, wherein said line and said path are arranged at a predetermined distance S from each other and wherein the distance S meets the condition $0.75*d \leq S \leq 2.5*d$, with the quantity d designating the diameter of the permanent magnets as measured radially to the circular path.

* * * * *